United States Patent

[11] 3,536,058

| [72] | Inventors | Peter J. Hearst<br>673 Devonshire Drive, and<br>Harold P. Vind, 5230 Beachcomber St.,<br>Oxnard, California 93030 |
|---|---|---|
| [21] | Appl. No. | 767,933 |
| [22] | Filed | Oct. 16, 1968 |
| [45] | Patented | Oct. 27, 1970 |

[54] CHEMICAL HEAT BARRIER FOR WET SUITS
9 Claims, 3 Drawing Figs.

[52] U.S. Cl. .................................................. 126/204, 126/400
[51] Int. Cl. ..................................................... A61f 7/06, F24h 7/00
[50] Field of Search ........................................... 126/204, 263, 400; 165/46

[56] References Cited
UNITED STATES PATENTS

| 2,289,425 | 7/1942 | Hogan............................ | 126/263 |
| 2,515,298 | 7/1950 | Feldman........................ | 126/204 |
| 3,182,653 | 5/1965 | Mavleos et al................. | 126/204 |
| 3,400,249 | 9/1968 | Mekjean et al. ............... | 126/400X |

Primary Examiner—Charles J. Myhre
Attorney—Q. Baxter Warner, Edgar J. Brower and Gayward N. Mann ABSTRACT: A chemical or chemical mixture is positioned within a porous intermediate layer of a protective suiting to maintain a given temperature by utilizing the heat of crystallization. This intermediate layer effectively constitutes a chemical heat barrier for protection of the wearer.

Patented Oct. 27, 1970

3,536,058

INVENTORS
PETER J. HEARST
HAROLD P. VIND
BY Hayward N. Mann
O. Baxter Warner
ATTORNEYS 3,536,058

CHEMICAL HEAT BARRIER FOR WET SUITS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a means of maintaining body warmth and more particularly to a method of maintaining the temperature of protective suiting by employing the heat of crystallization created during the solidification of a chemical substance, positioned in the suit, as the means for maintaining the warmth of the wearer.

2. Description of the Prior Art

Heretofore simple protective suiting, such as diver wet suits, has been a primary means of maintaining body heat during exposure to severe cold encountered in cold environments. However heat losses through such suits may be very large and in many instances additional sources of heat are required if human activity is required for any extended length of time.

A more heavily insulated suiting could possibly provide a better barrier to heat loss, but heavier insulation frequently leads to other undesirable complications. For example, an undesirable increase in buoyancy may accompany any increase in insulation of a diver's wet suit. This is due to the light weight of the closed-cell elastomeric materials which provide the wet suit with insulation. Since such elastomeric materials contain a multiplicity of minute air pockets, any increase in thickness of such materials necessarily provides undesirable increase in buoyancy which has its greatest effect at the body extremities where it is least desirable. Furthermore, increasing depth with resulting increasing pressures compresses the wet suit materials and will accordingly reduce the available insulation. Changes in depth will also produce undesirable changes in the buoyancy of such suiting.

Several external heat sources have been devised including back packs which provide heat from the electrical energy of a battery or from an isotopic power source through circulating water which serves as a heat exchange fluid. Diver wet suits may also be heated with hot water or with electricity fed through umbilical cords extending from the diver to the ocean surface. Such umbilical cords greatly reduce the diver's mobility which is already severely reduced due to the underwater conditions of the environment.

The fact that heat can be stored as heat of fusion and released as heat of crystallization, provided the proper chemical is available, has been known for some time. Thus, Telkes (Heating and Ventilating, Vol. 44, 68—75, May 1947) has suggested the use of sodium sulfate decahydrate as a heat storage material for the solar heating of houses. Telkes (Heating and Ventilating, Vol. 46, 68—74, Sept. 1949) further suggested disodium phosphate dodecahydrate and several other salt hydrates for this purpose, but also noted that these chemicals crystallize very slowly. Feldman (U. S. Pat. No. 2,515,298, July 1950) suggested the use of the same chemicals, or preferably those having at least 10 molecules of water of crystallization, in a body-warming device, such as a glove or a box. In this device the chemicals would be kept in a porous layer between two impervious layers. Such a device has apparently never been used for diver's suiting, quite possibly because of difficulties in obtaining the desired results with the chemicals specified in the patent.

SUMMARY OF THE INVENTION

The present invention comprises a means of heating a protective suiting device which employs the principle that a chemical will supply heat at a constant temperature while it undergoes a change of state from a liquid to solid phase. Specifically a chemical or chemical mixture is incorporated in an intermediate open-celled layer of the protective suiting. At or near ordinary temperatures the chemical will be in a fluid state ready to release its heat of crystallization which occurs upon freezing of the chemical when a wearer using the protective suiting becomes exposed to a cold environment. The Feldman patent mentioned previously is a substantial addition to a closely worked art. However the chemical substances set forth in his disclosure do not provide the same results as the present invention. The present invention employs a specific type of chemical with superior properties to provide a reliable heat of crystallization, thereby creating a barrier against unwanted heat loss.

STATEMENT OF THE OBJECTS OF INVENTION

An object of this invention is to provide a simple and reliable means of creating a heat barrier between an object and a cold environment.

Another object is to utilize heat of crystallization from a suitable chemical substance as a heat barrier for protection of an object from environmental cold.

A further object is to provide a suiting incorporating such chemical substance which will permit the chemical heat of crystallization to be used as a heat barrier for protection of an object.

Other objects, advantages, and novel features of the invention will become apparent from the following detailed description of the invention when considered in conjunction with the accompanying drawings.

DESCRIPTION OF THE PREFERRED EMBODIMENT

Figure 3:
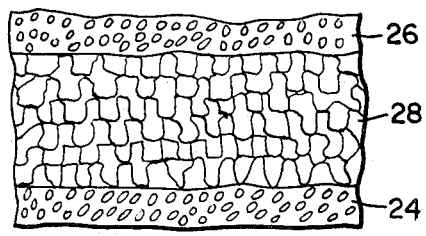
FIG. 3 is an enlarged cross section of the suiting wall along line 3–3 of FIG. 2 showing two closed-cell outer layers and an intermediate open-cell layer having the chemical solution incorporated therein.

Referring now to the drawing in detail, there is shown a section through the wall of a protective suiting 10 formed of material having a substantial degree of thickness such as wall portions 12 which may be provided with thinner, more flexible strips 14, 16, 18 and 20, not containing any chemical. One of such strips 20 may be provided with a zipper or slide fastener type closure 22 for ease of application and removal of the garment. It will be noted (FIG. 3) that such suiting comprises three layers of material in which the inner layer 24 and outer layer 26 are each constructed of materials having a closed-cell arrangement or a non-cellular structure or a combination of the two, while the intermediate layer 28 is reticulated or open-cell and is filled with a chemical solution used in storing heat in the form of heat of fusion and releasing this heat in the form of heat of crystallization. The relative thickness of the three aforesaid layers will vary depending upon the quantity of the chemical solution used. The sandwiched layers 24, 26 and 28 referred to above are preferably constructed of elastomeric materials.

The chemical employed should crystallize readily and at a constant temperature. It should crystallize appreciably below body temperature so that there is sufficient heat loss from the wearer to the suiting to prevent his active metabolism from keeping him uncomfortably warm. The chemical, on repeated fusion and solidification should always recrystallize at a rapid rate to its original composition so that all the heat of fusion will be given up readily as heat of crystallization. The chemical can be a pure compound or a eutectic mixture, and it may contain freezing point depressants to keep it from solidifying completely.

Lithium nitrate trihydrate has been found to be a superior substance for providing a reliable source of heat from the process of crystallization. Its melting point is 29.9°C. (86°F.), and its heat of crystallization is about 71 calories per gram. If the suiting is to be used for a diver, the following considerations are of importance. The normal heat loss of a diver is about 125 to 250 kilocalories in 1 hour (depending upon diver's weight, etc.), and the heat loss of a diver per hour is therefore equivalent to the heat of crystallization of about 1.8 to 3.6 kilograms (about 4 to 8 lbs.) of lithium nitrate trihydrate.

However, it should be remembered that the lithium nitrate does not supply heat to the diver but instead keeps the suiting at a constant temperature and reduces heat loss from the diver. The increased endurance therefore depends on the portion of the body that is covered by the triple layer suiting and not merely on the amount of chemical employed.

To prevent undesired rigidity of the suiting it is desirable that the chemical heat barrier of the protective suiting does not completely solidify. Accordingly it is preferable that the chemical used (lithium nitrate trihydrate) should contain a freezing point depressant (i.e., water, alcohol or other water soluble substances) which allows partial crystallization, but progressively decreases the freezing point of the remaining liquid chemical, thus insuring that some liquid will always be present. Alternately, or concurrently, it is preferable to provide flexible portions in the suiting, especially at any joints.

It will be apparent that the present protective suiting, using the principle that an included chemical will supply heat as it freezes, is not only employed in divers wet suits but obviously may be used for other purposes. Some of the potential uses might be suiting for downed aviators or astronauts. Another use might be packaging where the contents must be kept at a critical temperature.

Figure 1:
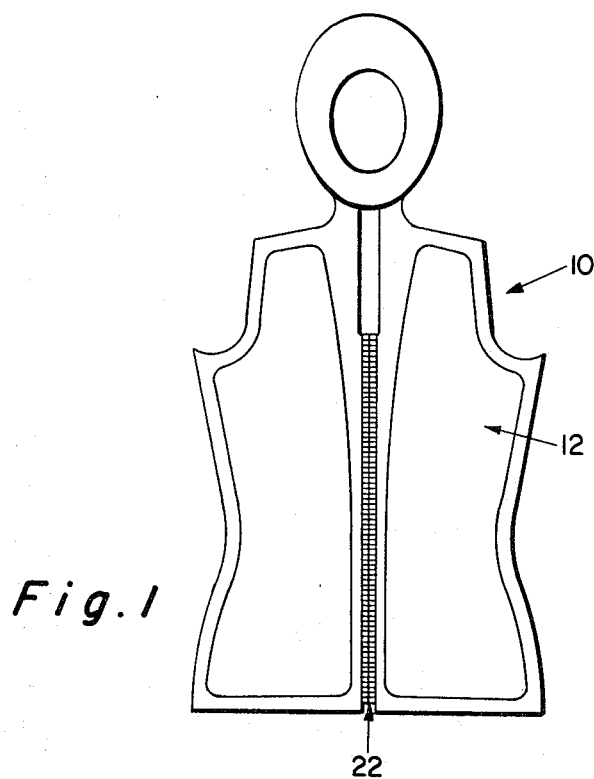
FIG. 1 is a front elevational view of one embodiment of a protective suit for use in warming an individual in a cold environment.
Figure 2:
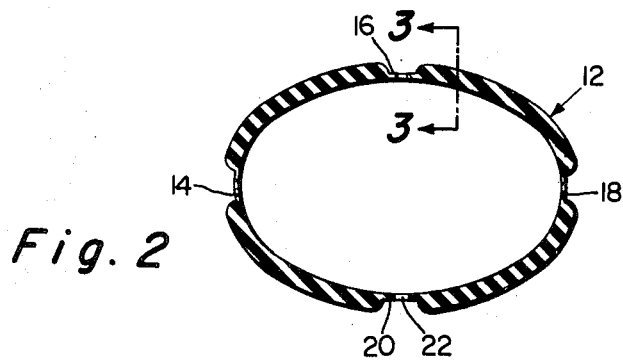
FIG. 2 is a transverse section along line 2–2 of FIG. 1.

It will be recognized that the protective suiting, such as illustrated in FIG. 1, may be designed to cover the entire body or any part thereof if so desired. Of course, where there is any tendency for the suit to become too rigid it is advantageous to provide strips or areas where greater flexibility is maintained, as by the provision of the vertical strips 14—20. Where the suiting covers joints, or where particular flexibility is needed, it may be desirable to omit the thick middle layer containing the chemical. The triple-layer suiting with the chemical can then be used in patches or cylindrical shapes at other portions of the body.

Obviously many modifications and variations of the present invention are possible in the light of the above teachings. It is therefore to be understood that within the scope of the appended claims the invention may be practiced otherwise than as specifically described.

I claim:

1. A multi-layered thermal wall construction comprising: a porous middle layer; a pair of nonporous (parallel) outer layers (integrally) positioned on opposite sides of the middle layer; and the chemical substance, lithium nitrate trihydrate, incorporated into the porous middle layer and adapted to release heat of crystallization when subjected to temperatures below the freezing point, thus constituting in effect a chemical heat barrier for the protection of an object enclosed by said wall construction.

2. A multi-layered thermal wall construction as defined in claim 1 wherein the pair of nonporous outer layers both have a closed cell arrangement.

3. A multi-layered thermal wall construction as defined in claim 1 wherein the pair of nonporous outer layers are both constructed of a continuous noncellular material.

4. A multi-layered thermal wall construction as defined in claim 1 wherein the pair of nonporous outer layers are constructed of a combination of closed cell and noncellular materials.

5. A multi-layered thermal wall construction as defined in claim 1 wherein a freezing point depressant has been added to said lithium nitrate trihydrate to prevent complete solidification.

6. A multi-layered thermal wall construction as defined in claim 5 wherein the freezing point depressant is selected from the group consisting of water and alcohol.

7. In a multi-layered protective suiting device having a porous middle layer and a pair of nonporous parallel outer layers integrally connected to opposed sides of the middle layer, the porous middle layer containing therein a chemical substance adapted to provide a protective heat of crystallization upon freezing when the protective suit and included chemical substance are subjected to a cold environment; the improvement comprising the use of lithium nitrate trihydrate as the chemical substance contained in the porous middle layer.

8. A method of heating a protective suit worn for protection against the deleterious effects of a cold environment comprising:
   incorporating lithium nitrate trihydrate within the inner portion of said suit;
   utilizing the heat of crystallization created when said lithium nitrate trihydrate changes from a liquid to a solid state after being subjected to temperature conditions below the freezing point thereof.

9. A thermal wall construction having a sufficient degree of flexibility to adapt it for incorporation into an underwater garment of the wet suit type comprising:
   a pair of spaced inner and outer layers of monocellular material;
   a middle layer between said inner and outer layers said middle layer being formed of a reticulated porous material which can be penetrated by a liquid saturant; and
   the chemical substance, lithium nitrate trihydrate, saturating said reticulated layer and releasing heat by heat of crystallization.